United States Patent [19]

Ganek et al.

[11] Patent Number: 5,878,047
[45] Date of Patent: Mar. 2, 1999

[54] APPARATUS FOR PROVISION OF BROADBAND SIGNALS OVER INSTALLED TELEPHONE WIRING

[75] Inventors: Alan G. Ganek, Chappaqua, N.Y.; Edith H. Stern, Boca Raton, Fla.; Barry E. Willner, Manor, N.Y.

[73] Assignee: International Business Machines Corporation, Armonk, N.Y.

[21] Appl. No.: 751,121

[22] Filed: Nov. 15, 1996

[51] Int. Cl.$^6$ ........................................................ H04J 1/10
[52] U.S. Cl. .......................... 370/486; 370/488; 370/489; 370/497
[58] Field of Search ..................................... 370/445, 485, 370/486, 487, 488, 489, 490, 493, 496, 497, 522

[56] References Cited

U.S. PATENT DOCUMENTS

| | | | |
|---|---|---|---|
| 4,775,987 | 10/1988 | Miller | 370/477 |
| 4,885,747 | 12/1989 | Foglia | 370/490 |
| 5,255,267 | 10/1993 | Hansen et al. | 370/488 |
| 5,329,572 | 7/1994 | Martens | 370/358 |
| 5,363,432 | 11/1994 | Martin et al. | 379/90.01 |
| 5,387,927 | 2/1995 | Look et al. | 370/432 |
| 5,499,241 | 3/1996 | Thompson et al. | 370/486 |
| 5,583,927 | 12/1996 | Ely et al. | 370/259 |

OTHER PUBLICATIONS

IEEE Communications Magazine, Apr. 1995, Philip J. Kyees et al., "ADSL: A New Twisted–Pair Access to the Information Highway", pp. 52–59.

*Primary Examiner*—Min Jung
*Attorney, Agent, or Firm*—Ohlandt, Greeley, Ruggiero & Perle

[57] ABSTRACT

A network includes a facility for transmitting baseband telephone signals, plural subscriber locations, and twisted pair circuits which connect each subscriber location to the baseband telephone facility. The network further includes apparatus for transmitting and receiving broadband signals over the twisted pair circuits. A broadband transmitter is coupled to a network twisted pair circuit and outputs a broadband signal for delivery to a subscriber location. A first twisted pair circuit is utilized as an intermediate transmission path for the broadband signals. A distribution module is coupled to the first twisted pair circuit and is connected to a destination subscriber location via a destination twisted pair circuit. First filter circuits are connected in the network twisted pair circuit; are transparent to the baseband telephone signals and block the broadband signals. Second filter circuits are connected in the first twisted pair circuit; are transparent to baseband telephone signals and block the broadband signals. A coupling circuit connects the first and second filter circuits and enables passage of broadband signals from the network twisted pair circuit to the first twisted pair circuit, and then to a distribution module and to a broadband destination location.

8 Claims, 6 Drawing Sheets

APPARATUS FOR PROVISION OF BROADBAND SIGNALS OVER INSTALLED TELEPHONE WIRING

FIELD OF THE INVENTION

This invention relates to the provision of broadband signals and services to subscribers connected to the telephone network and, more particularly, to apparatus for providing such broadband signals and services over installed twisted pair circuits wherein the apparatus is completely transparent to baseband telephone signals.

BACKGROUND OF THE INVENTION

Use of the installed twisted pair telephone network to provide transmission facilities for broadband signal transmission has been suggested in the prior art. Asymmetric digital subscriber line (ADSL) systems take advantage of the existing twisted-pair copper loop that currently provides customer access to the telephone network. ADSL systems are described in an article entitled "ADSL: A New Twisted-Pair Access to the Information Highway", Kyees et al., IEEE Communications Magazine, April 1995, pages 52–59.

In such a system, an ADSL modem is placed at each end of a loop to create a high speed access link in a frequency range above the existing telephone service. ADSL standards specify a high speed simplex channel which provides a downstream data rate of up to 6 megabits/second (mb/s). The downstream channel can be divided into a number of subchannels, if desired. A 64 kilobits/second duplex data channel is associated with the high-speed channel to allow interactive control and information flow between a subscriber and an information service provider. All of this signal bandwidth rides over the 0 to 4 kHz band allotted to basic telephone services.

Through the use of filters, ADSL channels and the telephone channel are maintained separate. At the subscriber location, a splitter diverts the telephone service to the telephone handset, allowing the broadband signals to be received by an ADSL terminal unit which further distributes the broadband signals to various receiving units, such as set-top boxes, computer terminals and other devices. Separate wiring is utilized for connection between an ADSL terminal unit and its respective destination devices.

Because the broadband services are delivered from a centrally located provider to individual subscribers over potentially long distance, twisted pair circuits, ADSL requires sophisticated modems to be used at the receiving ends to cope with variable levels of signal degradation. Such modems are expensive, yet are necessary to assure high quality broadband signal reception at the subscriber. Further, service personnel are required to install special wiring at the subscriber's premises to enable distribution therein of the broadband signals.

In addition to the ADSL system, others have described various techniques and systems for enabling broadband distribution to subscribers connected to the existing twisted pair telephone network. U.S. Pat. No. 4,885,747 to Foglia, entitled "Broadband and Baseband LAN", describes a point-to-point communication system wherein a frequency coupler circuit accepts both baseband and broadband signals and concentrates those signals onto one end of a length of shielded twisted pair conductors. A second frequency coupler is coupled to the opposite end of the shielded twisted pair and separates and distributes the broadband and baseband signals to respective connected ports to which utilization devices are connected. At those ports, "lobe" assembly devices provide interface functions for each particular attached machine, or group of machines.

U.S. Pat. No. 5,255,267 to Hansen et al., entitled "Apparatus for Combining Broadband and Baseband Signal Transmissions" combines such signals in a baseband distribution cable for transmission to various user devices. The broadband signal is split into a plurality of segments, each segment supported by a baseband repeater. Filters prevent interference with the baseband signals in each segment and provide a high impedance to the baseband signals. The system is described in the context of an Ethernet network.

U.S. Pat. No. 5,499,241 to Thompson et al., entitled "Broadband Communication System" describes a system for coupling telephony or other digital networks to a cable television network. The system transmits multiple telephony signals in 3 MHz channels in a forward band of the cable TV network. Audio and control signals returning from the subscriber are digitized under telephony signals and modulated on a 50 kHz carrier that is used for reverse direction transmissions. U.S. Pat. No. 5,363,432 to Martin et al., entitled "Transmission of Broadband Signals to Subscribers Using a Telecommunications Cable" describes a method of transmitting a broadband signal to a subscriber residence, wherein the broadband signal is coupled between a shield and one of the conductors of a pair of conductors.

U.S. Pat. No. 5,387,927 to Look et al., entitled "Method and Apparatus for Broadband Transmission from a Central Office to a Number of Subscribers" describes the forming of multiple channels of digital signals and modulating a plurality of carrier signals therewith. The resultant modulated channels are multiplexed to form a combined signal which is then used to modulate a laser light beam. The modulated light beam is transmitted over a light fiber to local distribution boxes. There, the modulated signals are converted to electrical signals and are broadcast to subscriber devices.

The above-described prior art requires either: expensive modems for receipt of broadband signal which have travelled over long distance twisted pair links; installation of dedicated wiring within the subscriber's premises; or installation of entirely new transmission facilities to enable transmission of both baseband and broadband signals.

Accordingly, it is an object of this invention to provide a system for distributing broadband services over the existing, twisted pair, non-shielded telephone network.

It is a further object of this invention to provide a facility for transmission and receipt of broadband signals over the installed telephony network, wherein already present wiring in a subscriber facility is used for interconnection of the broadband signals to subscriber devices.

It is yet another object of this invention to provide a broadband distribution system which uses the installed telephony network and wherein added broadband facilities are transparent to baseband telephone signals.

It is still another object of this invention to utilize the installed twisted pair telephony network for transmission of broadband signals, wherein signal routing is substantially independent of pre-existing twisted pair circuit paths.

SUMMARY OF THE INVENTION

A network includes a facility for transmitting baseband telephone signals, plural subscriber locations, and twisted pair circuits which connect each subscriber location to the baseband telephone facility. The network further includes apparatus for transmitting and receiving broadband signals over the twisted pair circuits. A broadband transmitter is coupled to a network twisted pair circuit and outputs a broadband signal for delivery to a subscriber location. A first twisted pair circuit (which has no predetermined relationship to the network twisted pair circuit nor to the subscriber location served thereby) is utilized as an intermediate transmission path for the broadband signals. A distribution module is coupled to the first twisted pair circuit and is connected to a destination subscriber location via a destination twisted pair circuit. First filter circuits are connected in the network twisted pair circuit; are transparent to the baseband telephone signals and block the broadband signals. Second filter circuits are connected in the first twisted pair circuit; are transparent to baseband telephone signals and block the broadband signals. A coupling circuit connects the first and second filter circuits and enables passage of broadband signals from the network twisted pair circuit to the first twisted pair circuit, and then to a distribution module and to a broadband destination location. In a preferred embodiment, the destination twisted pair circuit exhibits a physical distance no more than about 1,500 feet from the subscriber's premises, thereby enabling use of low cost modem technologies that have been developed for local area network applications.

DETAILED DESCRIPTION OF THE INVENTION

As will be hereafter understood, the invention utilizes the installed, twisted pair telephone network to distribute broadband signal services by making use of the known ability of twisted pair wiring to carry broadband signals; but avoids any need for alteration of the telephony network which would affect or otherwise alter telephone service. A critical feature of this invention is the realization that, with proper filtering, segments of twisted pair wiring can be used as opportunistic signal paths for broadband signals, even though the twisted pair circuit path may originate and terminate at locations which have no predetermined locational relevance to the source or destination of the broadband signals. This feature of the invention enables the broadband signals to "piggy back" on advantageously available twisted pair segments and allows highly flexible creation of a desired broadband physical circuit path.

Within each subscriber location, only installed twisted pair wiring is used to carry broadband signals to the subscriber receiving devices. This usage is enabled by provision of a modem which is non-responsive to baseband telephone signals but receives, in the standard manner, broadband signals above the baseband and provides demodulated data signals to connected computational devices.

Finally, broadband signal distribution modules that are connected to destination subscriber premises are positioned such that no twisted pair connected between such a module and a subscriber premise exceeds a length of approximately 1,500 feet, thereby enabling use of inexpensive modem technologies which are already used in local area network configurations.

In the description below, various levels of distribution modules will be described in the context of enabling broadband service for 10,000 subscriber locations, using a 500 mb/s backbone transmission path. It is to be understood, however, that the recited number of subscriber locations and specific broadband transmission frequency values are used only for purposes of example and that the overall architecture of the invention will vary in accordance with the number and physical relationships of the subscriber locations and the installed telephone network. Thus, one skilled in the art will understand that the precise examples to be described hereafter may be modified to provide the desired broadband services over the installed telephone network using an architectural configuration which is to be matched to the geography and physical characteristics of the already existing twisted pair network.

Figure 1:
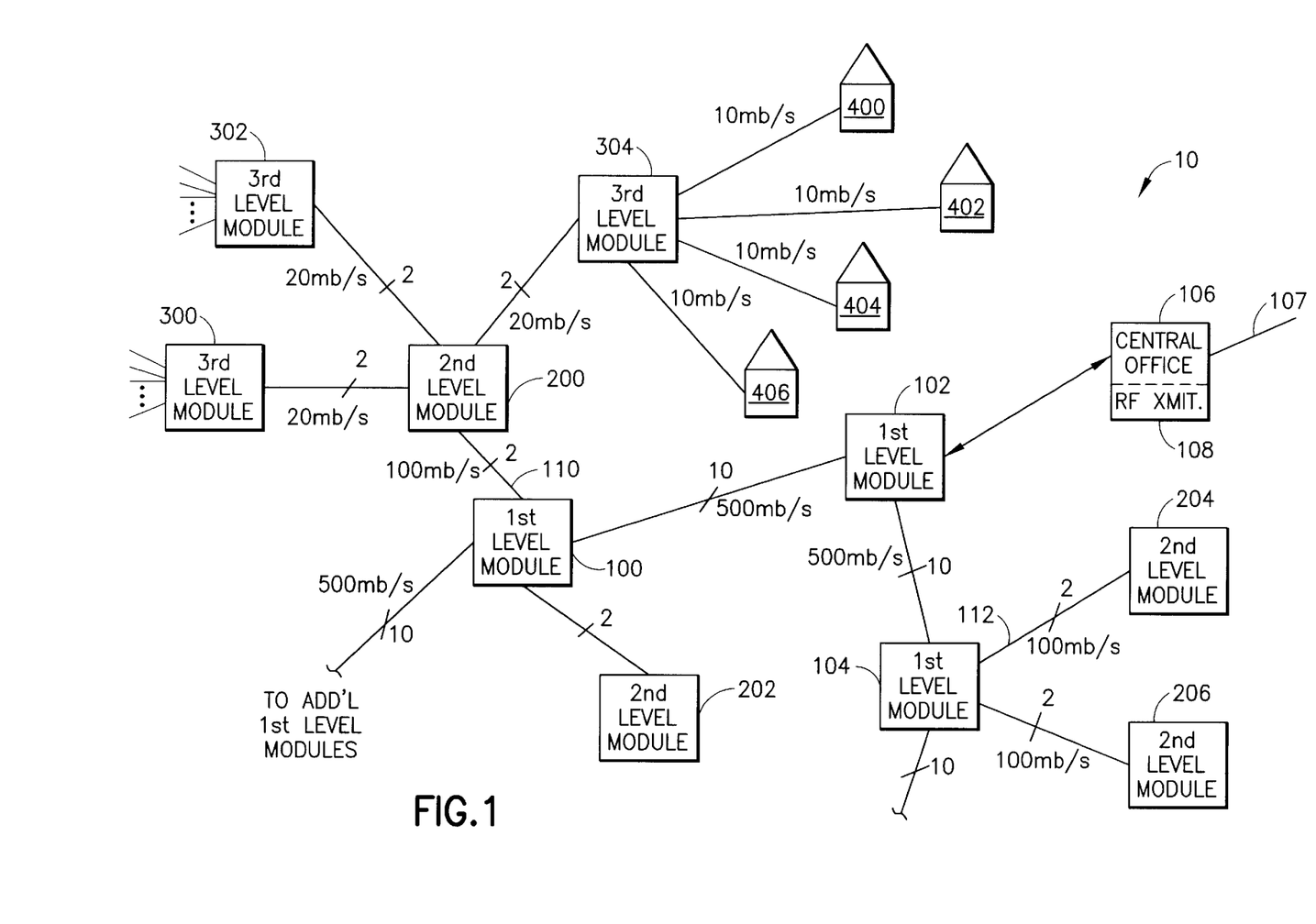
FIG. 1 is a block diagram showing the architecture employed to distribute broadband signals over installed twisted pair telephone circuits.

Turning to FIG. 1, a distribution network 10 enables transmission of broadband services over the installed twisted pair telephone network. Three levels of distribution modules are employed to enable routing of broadband signals to subscriber locations, i.e., first level, second level and third level distribution modules. Each of the first, second and third level distribution modules shares the same overall architecture, but differs in both the accommodated bandwidths and number of twisted pair circuits required for interconnection to neighboring distribution modules.

As shown in FIG. 1, plural first level distribution modules 100, 102 and 104 are connected as part of a ring (remaining first level modules in the ring are not shown). A central office 106 includes both standard telephone switching facilities and an RF transmission module 108 which enables origination of a broadband services, such as video, data, and other broadband offerings. Central office 106 may further be connected to an external wide area network via a fiber connection 107 or other transmission facility.

Each of first level modules 100, 102 and 104 is connected to another first level module via a 500 mb/s link comprised of 10 twisted pair, each twisted pair supporting 50 mb/s of transmission bandwidth. Connected to first level distribution modules 100 and 104 are second level distribution modules 200, 202 . . . , and 204, 206, . . . , respectively. First level distribution modules are coupled to second level distribution modules via 100 mb/s transmission paths, each comprising two twisted pair carrying 50 mb/s each. Thus, first level distribution module 100 is connected to second level distribution module 200 via a dual twisted pair 100 mb/s circuit 110. First level distribution module 104 is also connected to a pair of second level distribution modules 204 and 206, via dual twisted pair circuits 112 and 114.

Each second level distribution module (e.g. 200) is coupled to one or more third level distribution modules 300, 302, 304, etc. via dual twisted pair circuit, each twisted pair circuit supporting ten mb/s of transmission to provide a 20 mb/s broadband circuit. Finally, each third level distribution module is coupled to one or more subscriber facilities (e.g., 400, 402, 404, 406, etc.), via a 10 mb/s single twisted pair circuit. Each subscriber location is preferably located within about 1,500 feet of the physical location of the connected third level distribution module.

Each of the first level, second level and third level distribution modules exhibits asymmetric speed characteristics, with downstream signal speed exhibiting a higher bit per second rate than the up stream direction. The transmission speeds indicated above are for the downstream, high speed direction.

Even though each of the connecting circuits illustrated between the first, second and third level distribution modules is indicated as a continuous single circuit, that is the case only in an electrical sense. In a physical sense, the invention makes use of opportunistic availability of physical circuit paths to provide broadband transmission pathways. More specifically, opportunistic use of installed wiring enables the routing of broadband signals over available twisted pair circuits, irrespective of either the source or destination baseband facilities connected to either terminus of the twisted pair circuit. This feature will be understood by referring to FIG. 2, wherein twisted pair circuits 120 and 122 are illustrated, each twisted pair circuit representing an independent baseband circuit path between a central office and a subscriber location.

Figure 2:
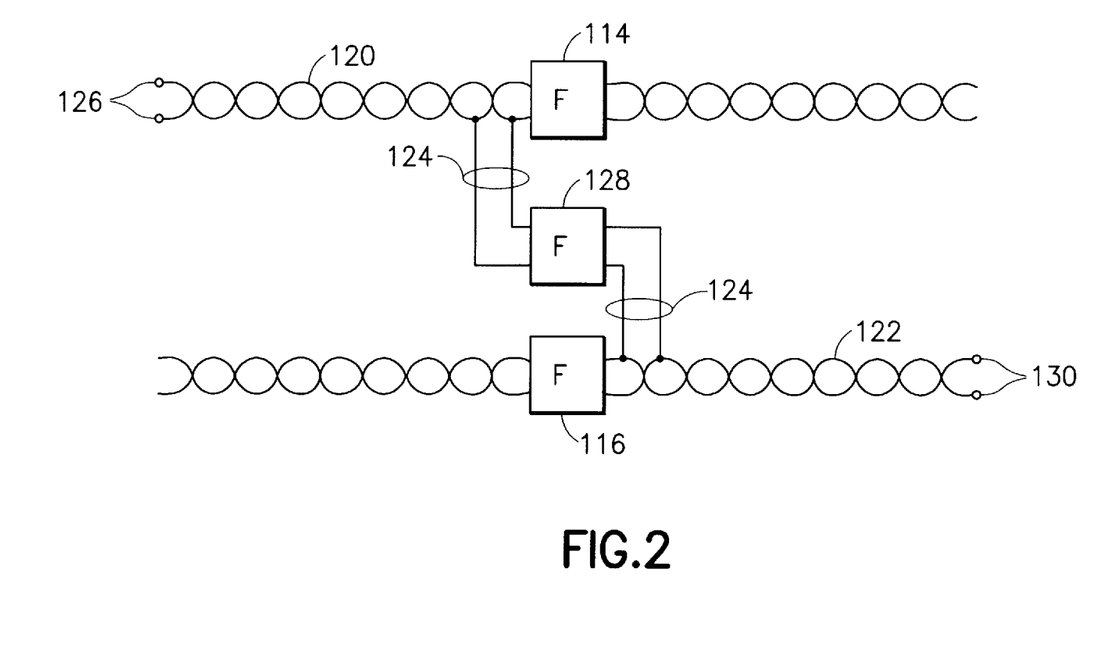
FIG. 2 is a schematic illustrating an interconnection between twisted pair circuits which enables opportunistic use of any adjacent twisted pair circuit for transmission of broadband signals.

It is assumed that twisted pair circuit 120, at some point in its physical travel between the central office and its respectively connected subscriber location, is placed physically close to twisted pair 122. It is further assumed that twisted pair circuit 120 includes a portion which is routed in a direction over which broadband services are to be transmitted. In such case, a pair of filters 114 and 116 are connected into twisted pair circuits 120 and 122, respectively. Each of filters 114 and 116 is transparent to the telephone baseband, but is blocking to the broadband signal stream. A connection circuit 124 including a baseband blocking filter 128 is coupled between the broadband input side of filter 116 and the broadband output side of filter 114 (i.e., in the downstream direction towards output terminals 126). Filter 128 enables passage of higher frequency broadband signals. Accordingly, broadband signals appearing at upstream terminals 130, travel down twisted pair 122, through interconnection circuit 124 (and filter 128) to twisted pair circuit 120 and output terminals 126. Baseband signals are blocked by filter 128 and are passed by filters 114 and 116, respectively.

The use of filters 114, 116, 128 and coupling circuit 124 enables any physically adjacent twisted pair circuit which happens to be routed in the direction of a broadband destination, to be employed as an opportunistic signal path for the broadband signals. Further, multiple such "jumpers" from one twisted pair to another, to another, etc., can be utilized to provide a continuous broadband signal pathway between first, second and third level distribution modules, as the need exists.

Figure 3:
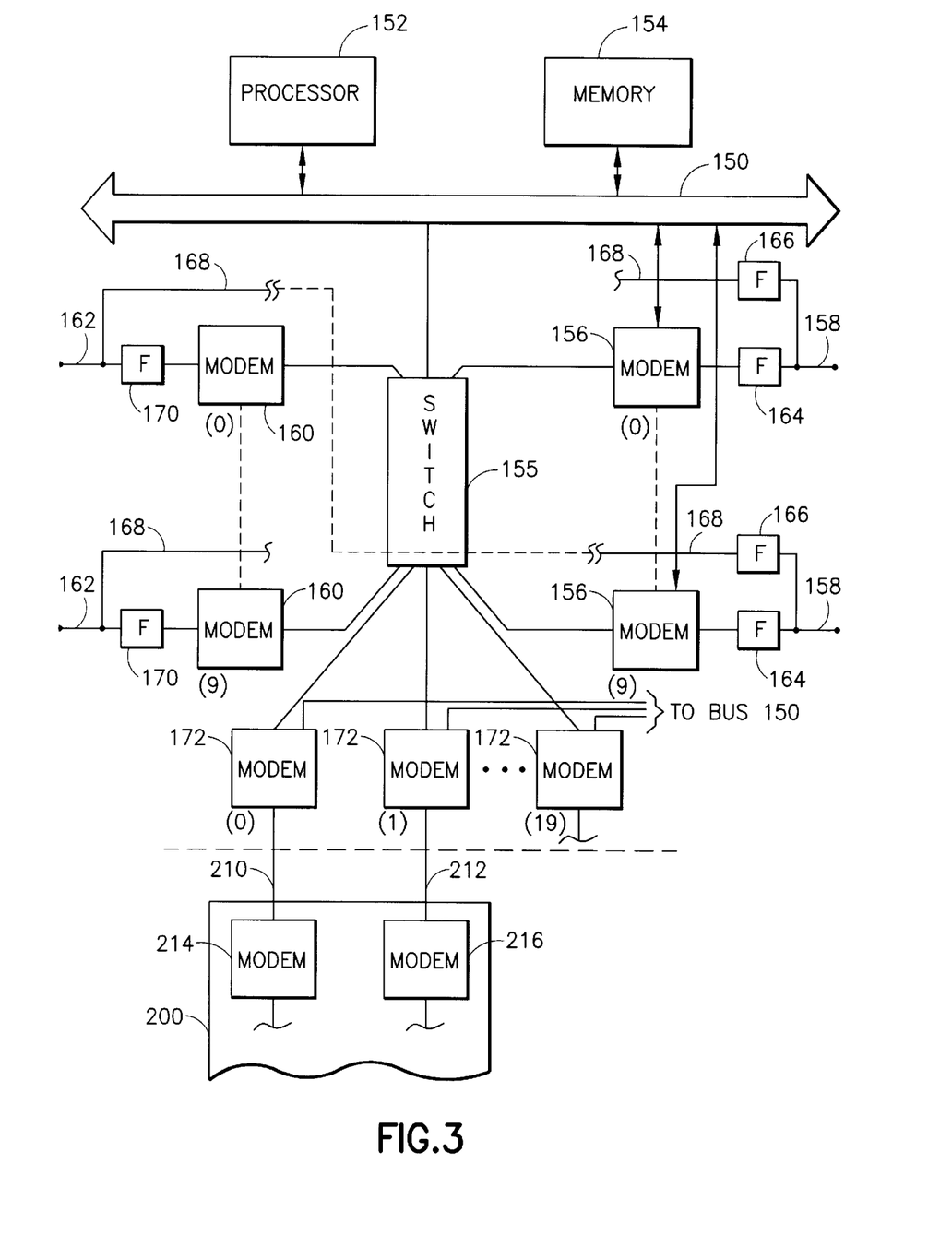
FIG. 3 is a high level block diagram of a first level broadband distribution module employed in the invention hereof.

FIG. 3 illustrates the architecture of a first level distribution module. As indicated above, a first level distribution module connects to other first level distribution modules via a 500 mb/s link comprised of 10 twisted pair circuits. Each twisted pair circuit supports 50 mb/s of transmission of bandwidth. Each first level distribution module includes a bus structure 150 which provides communication between the various elements of the module. A processor 152 and memory 154 provide overall operational control of the first level distribution module. A switch 155 provides routing of broadband signals under control of processor 152. Ten modems 156 are provided for each of ten incoming 50 mb/s twisted pair circuits 158. Similarly, ten modems 160 are provided for connection to ten out-going 50 mb/s twisted pair circuits 162.

Connected between each input twisted pair circuit 158 and associated input modem 156 is a filter 164 which is blocking to baseband frequencies and transparent to broadband frequencies. An additional filter 166, that is transparent to baseband signals and blocking to broadband signals serves as a portion of baseband shunt circuit 168 which is routed to a downstream twisted pair circuit 162 so as to maintain the direct, feed-through twisted pair connection required for a ringing circuit. A baseband blocking filter 170 prevents upstream flow of baseband signals into a modem 160 In such manner, bypass circuits 168 provide for continuation of the standard telephone service and bypass the broadband switching function provided by switch 155.

Switch 155 is controlled by processor 152 and is an any-to-any switch which enables any signal from a modem 156 to be transferred to any output modem 160 (or to any of 20 modems 172, to be described below). Each modem 156, upon receiving a broadband signal passes address information to processor 152 which, in turn, controls switch 155 to properly route the incoming broadband signals to an outgoing modem 160.

As indicated above, modems 156 and 160 are principally used for connection between first level distribution modules. A plurality of further modems 172 are also connected to switch 155 and provide connections to second level distribution modules (e.g., 200). A second level distribution module 200 is connected via a pair of twisted pair circuits 210 and 212 to a pair of modems 172. In such manner, second level distribution module 200 receives 100 mb/s, with 50 mb/s being applied over each twisted pair circuit 210 and 212, respectively. By employing 20 modems 172, a first level distribution module has the ability to feed broadband signals to up to ten second level distribution modules.

Figure 4:
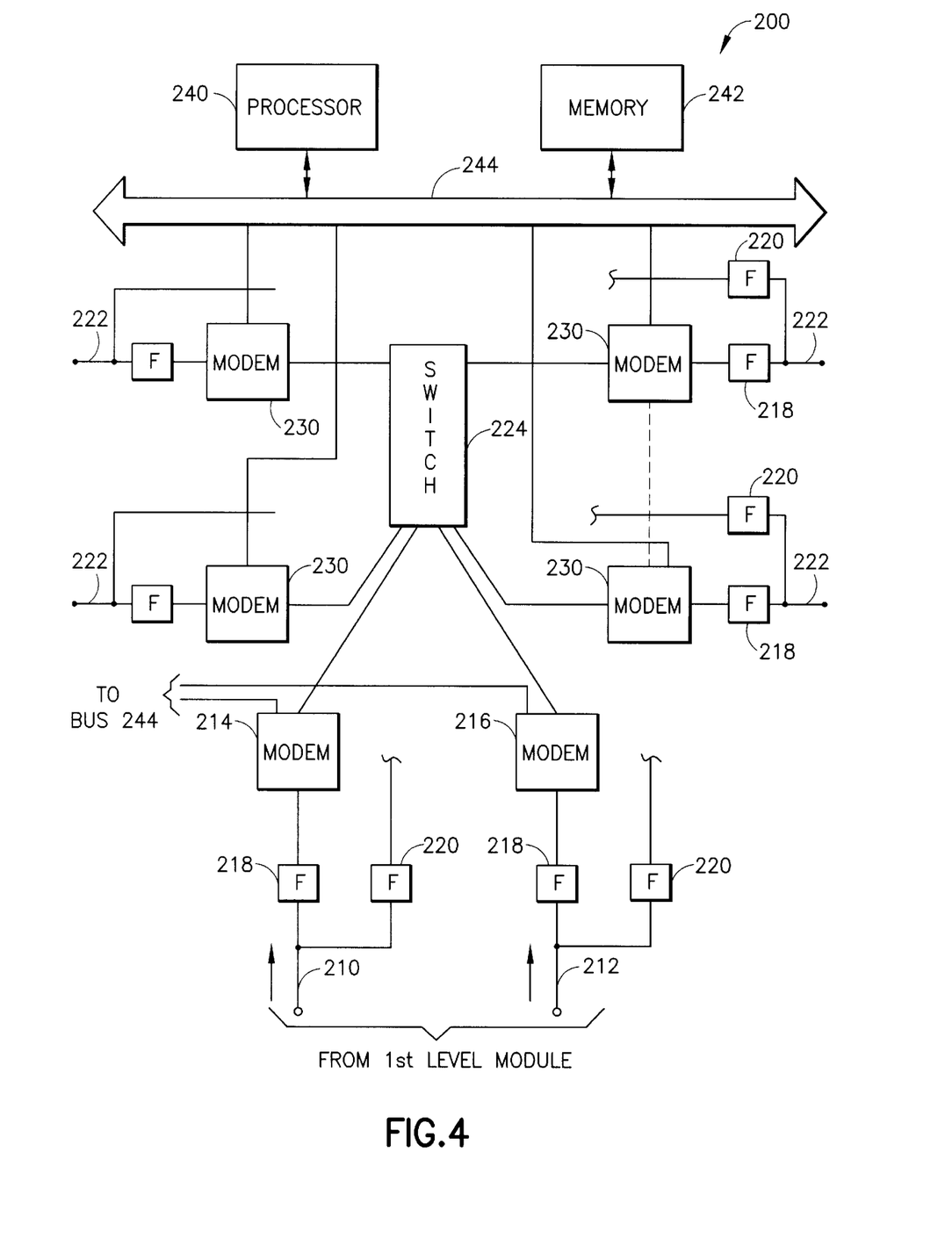
FIG. 4 is a high level block diagram of a second level broadband distribution module employed in the invention hereof.

Turning to FIG. 4, further detail is illustrated of a second level distribution module 200. It will be noted that the basic architecture of second level distribution module 200 is distinctly similar to that of a first level distribution module, except that a pair of modems 214 and 216 are used to input 50 mb/s signals from twisted pair circuits 210 and 212, respectively. At the input to each of modems 214 and 216 is a filter 218 which blocks baseband signals and causes them to bypass, via a filter 220 which blocks broadband signals, to an outgoing twisted pair circuit 222. As indicated above, this connectivity enables all baseband telephony information to bypass the switching function present in each of the distribution modules and maintains standard telephony service to attached subscribers.

The outputs from modems 214, 216 are fed to a switch 224 which, in the manner described for the first level distribution module of FIG. 3, provides any-to-any switching for connected modems. In the case of second level distribution module 200, 20 modems 230 are provided, 2 each for connection to a third level distribution module (e.g., 304 in FIG. 1). Each pair of modems 230 which connect to a third level distribution module provide ten mb/s, enabling each third level distribution module to receive 20 m/bs over the two twisted pair circuits 222.

The operation of switch 224 is controlled by a resident processor 240 and memory 242, both of which are interconnected via a bus 244 to each of the subassemblies present in second level distribution module 200. Processor 240 and memory 242 provide the functionality necessary to enable switch 224 to be operated in accordance with address information received via one or more of modems 214, 216 or 230. Each of modems 214, 216 and 230 provides a buffering function and includes sufficient intelligence to provide the address information to processor 240, which responds thereto by appropriately operating switch 224 to make the necessary interconnection between incoming and outgoing modems.

Figure 5:
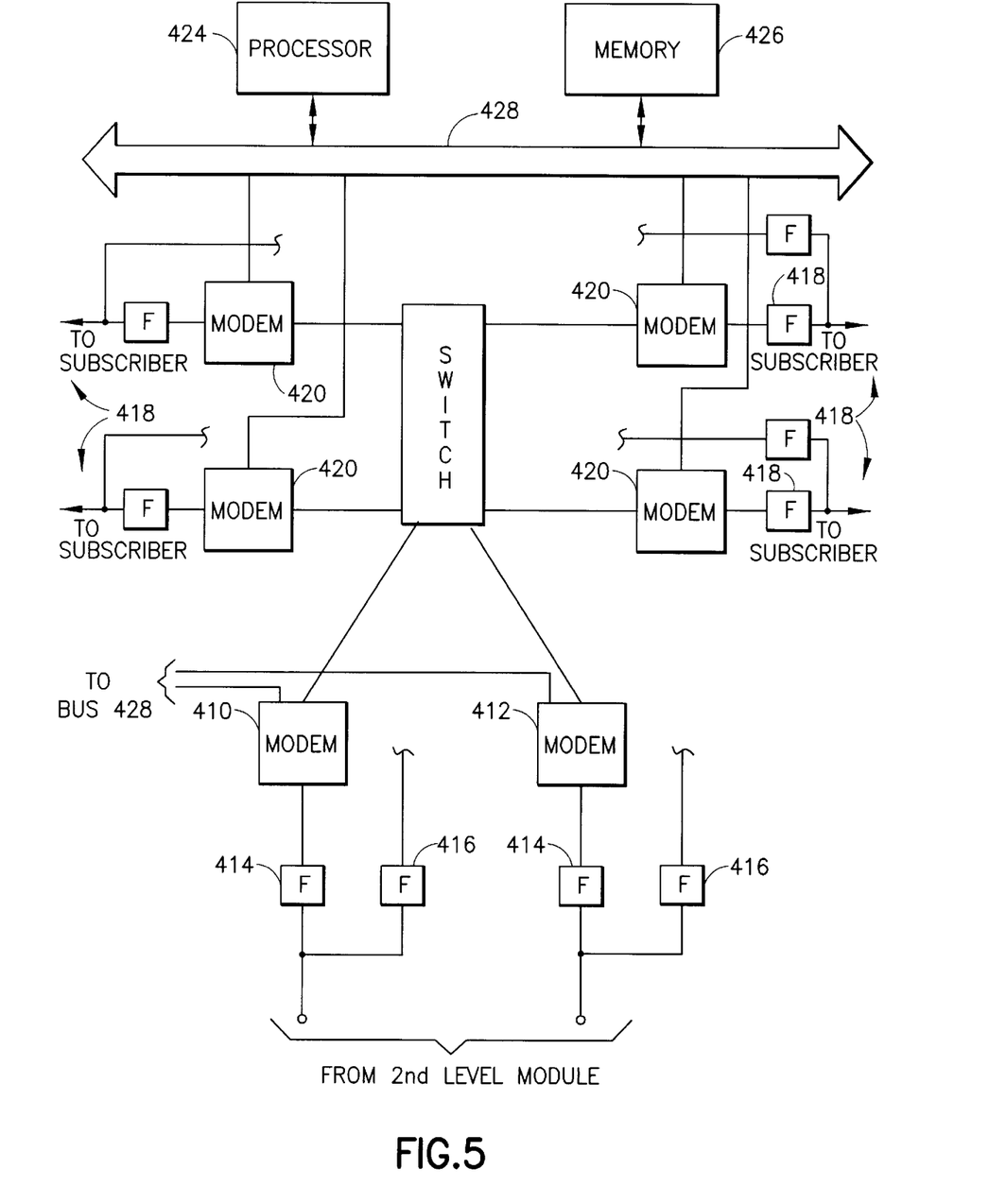
FIG. 5 is a high level block diagram of a third level broadband distribution module employed in the invention hereof.

FIG. 5 illustrates the, architecture of a third level distribution module 400 which exhibits substantially identical architecture to a second level distribution module. Each third level distribution module includes a pair of modems 410 and 412 for connection to an associated second level distribution module. In similar manner to that described above, filters 414 and associated filters 416 enable bypass of baseband signals to output twisted pair circuits 418.

Each third level distribution module is adapted to connect to 10 subscriber premises via a direct twisted pair circuit 418 and to provide, via an associated modem 420, a 10 mb/s broadband signal. As described above, a processor 424 and memory 426, via bus 428, provide necessary routing and control information to enable broadband signals to reach a proper subscriber destination.

Each third level distribution module is positioned so that it is preferably within 750 feet and, no more than about 1500 feet from each of the 10 subscriber premises it services. This positioning assures that inexpensive modem technology, such as is employed in Ethernet local area network modems, can be utilized to receive incoming broadband signal data in the subscribers' premises.

Figure 6:
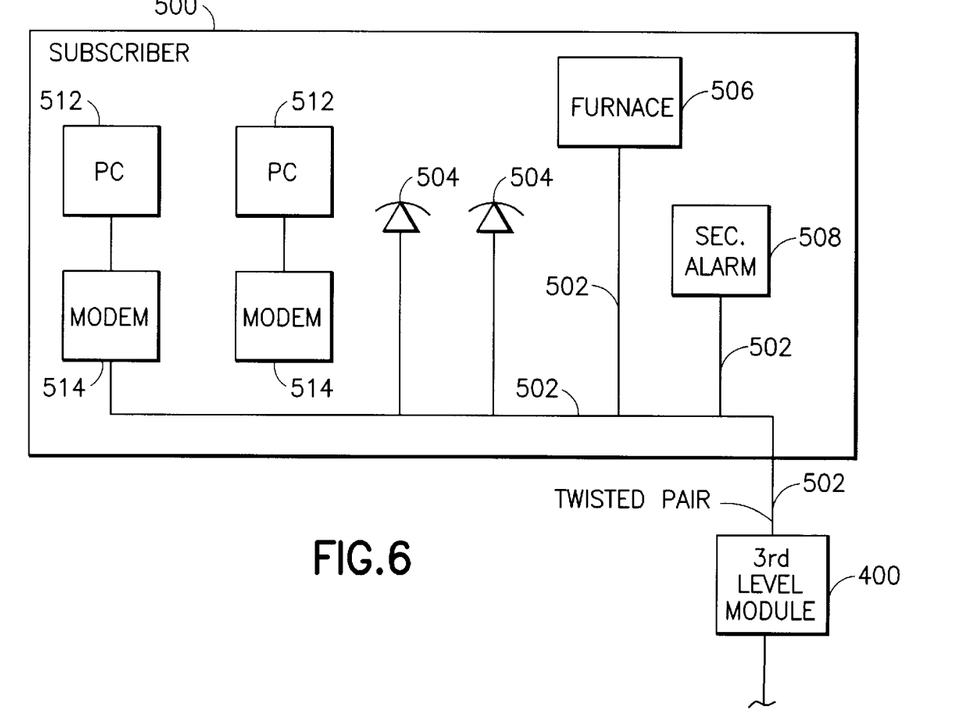
FIG. 6 illustrates a subscriber location which connects directly to a third level distribution module, using existing telephone wires, both inside and outside, to enable distribution of both telephony and broadband signals.
Figure 7:
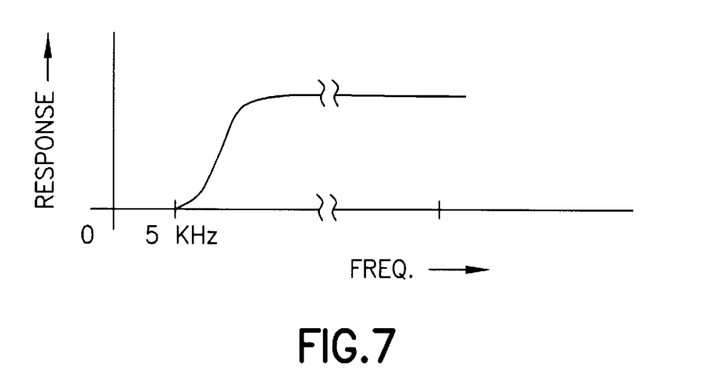
FIG. 7 is a plot of frequency versus response of a modem utilized to enable broadband signals to be extracted from a residential twisted pair wiring.

In FIG. 6, a third level distribution module 400 is connected via an existing telephone twisted pair circuit 502 to a subscriber location 500. Note that within subscriber location 500, all interconnections between devices requiring communication with external sources/destinations, are interconnected via existing telephone twisted pair circuit 502. Thus, telephones 504 are connected to twisted pair circuit 502, in the normal fashion, as also are furnace 506 and security alarm 508. Computers 512 are connected to twisted pair circuit 502 via modems 514. Each of modems 514 exhibits a response characteristic, such as that shown in FIG. 7. In essence, each modem is blocking to signals in the baseband region of 0 to 5 kHz and exhibits a relatively flat response characteristic to signals above 5 kHz. This characteristic enables reception of broadband data signals that are present on twisted pair circuit 502, and blockage of baseband signals.

The above-described system architecture enables provision of broadband services over the existing telephone twisted pair network of broadband signals between opportunistically available twisted pair circuits to provide connections between interspersed distribution modules. It avoids the need for installation of additional long distance circuits. Within each distribution module, bypass connections are provided which enable uninterrupted baseband telephone service to be maintained. Further, within each subscriber location the architecture enables direct connection of communication devices to already existing telephony twisted pair circuits, avoiding a need for installation of special in-premise wiring. The only special in-premise requirement is a modem which is structured to be insensitive to baseband signals. Lastly, by positioning third level distribution modules within a relatively short signal transmission distance from associated subscriber locations, low cost, existing modem technologies can be employed that are already widely used in local area network applications.

The above description has only considered details of downstream communications facilities. One skilled in the art will realize that upstream communication capability is also required in each level of distribution module, and that its architecture is much the same as that shown above. Further, the upstream channels can utilize portions of the downstream facilities where appropriate.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A network including a central facility for transmitting baseband telephone signals to a plurality of subscriber locations, said network further comprising:

a first twisted pair circuit for connecting said central facility to a telephone subscriber location and for carrying said baseband telephone signals thereto;

a second twisted pair circuit for carrying broadband signals;

distribution means coupled to said first twisted pair circuit, said second twisted pair circuit and to a broadband subscriber location via a destination twisted pair circuit, said broadband subscriber location and telephone subscriber location having no predetermined telephony electrical interconnection; and said distribution means further including a broadband coupling circuit for connecting said first twisted pair circuit and said second twisted pair circuit, and for enabling broadband signal flow between said first twisted pair circuit and said broadband subscriber location but blocking baseband telephone signal flow therebetween.

2. The network as recited in claim 1, wherein said second twisted pair circuit and first twisted pair circuit form portions of twisted pair circuits other than said destination twisted pair circuit.

3. The network as recited in claim 2, wherein said destination twisted pair circuit which connects said broadband subscriber location to said distribution means exhibits a physical length of no greater than about 1500 feet.

4. The network as recited in claim 1, further comprising:

modem means positioned within said broadband destination location and coupled to said destination twisted pair circuit, said modem means exhibiting a passband for received signals that excludes said baseband telephone signals, but includes broadband signals, thereby enabling said modem means to be directly connected to said destination twisted pair circuit.

5. The network as recited in claim 1, wherein all circuits within said broadband destination location that are coupled to said destination twisted pair circuit are twisted pair circuits used for carrying said baseband telephone signals.

6. The network as recited in claim 1, wherein each said distribution means further includes circuit means for separating said baseband telephone signals from said broadband signals to enable unimpeded passage of said baseband telephone signals through said distribution means.

7. The network as recited in claim 6, wherein each said distribution means further includes circuit means for routing said broadband signals in accord with address information to one or more broadband destination locations.

8. The network as recited in claim 6, further comprising a broadband transmission means for providing broadband signals, and wherein plural distribution means are coupled between said broadband transmission means and each said subscriber location to provide routing of broadband signals between said plural distribution means and between said plural distribution means and said subscriber locations.

* * * * *